United States Patent
Baek

(10) Patent No.: US 10,061,448 B2
(45) Date of Patent: Aug. 28, 2018

(54) MANUFACTURING METHOD OF TOUCH SCREEN PANEL

(71) Applicant: Samsung Display Co., Ltd., Yongin-si (KR)

(72) Inventor: Sang Min Baek, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 250 days.

(21) Appl. No.: 14/864,311

(22) Filed: Sep. 24, 2015

(65) Prior Publication Data

US 2016/0154500 A1  Jun. 2, 2016

(30) Foreign Application Priority Data

Nov. 28, 2014 (KR) .................. 10-2014-0169121

(51) Int. Cl.
*G06F 3/044* (2006.01)
(52) U.S. Cl.
CPC .... *G06F 3/044* (2013.01); *G06F 2203/04103* (2013.01); *G06F 2203/04111* (2013.01)
(58) Field of Classification Search
CPC . G06F 2203/04103; G06F 2203/04111; G06F 3/044; H04L 43/04; H04L 67/10; H04Q 9/00
See application file for complete search history.

(56) References Cited

U.S. PATENT DOCUMENTS

| 6,483,498 | B1 * | 11/2002 | Colgan | G06F 3/045 178/18.05 |
| 7,924,350 | B2 * | 4/2011 | Ma | G02F 1/13338 349/12 |
| 2010/0182250 | A1 * | 7/2010 | Kang | G06F 3/0416 345/173 |
| 2011/0267288 | A1 * | 11/2011 | Jeon | G06F 3/0412 345/173 |
| 2011/0268936 | A1 * | 11/2011 | Kang | G06F 3/044 428/203 |
| 2012/0073866 | A1 * | 3/2012 | Hirai | G06F 3/044 174/257 |
| 2012/0075207 | A1 * | 3/2012 | Jang | G06F 3/044 345/173 |
| 2014/0151325 | A1 * | 6/2014 | Baek | G06F 3/044 216/13 |
| 2014/0176488 | A1 * | 6/2014 | Jo | G06F 3/0412 345/174 |
| 2014/0204054 | A1 * | 7/2014 | Kim | G06F 3/0412 345/174 |
| 2016/0154500 | A1 * | 6/2016 | Baek | G06F 3/044 29/622 |

FOREIGN PATENT DOCUMENTS

| KR | 1020130017840 | 2/2013 |
| KR | 1020130141761 | 12/2013 |
| KR | 1020140018669 | 2/2014 |

* cited by examiner

*Primary Examiner* — Minh Trinh
(74) *Attorney, Agent, or Firm* — H.C. Park & Associates, PLC

(57) ABSTRACT

A manufacturing method of a touch screen panel includes: forming touch electrodes on a substrate; forming an insulating layer on the touch electrodes; disposing an adhesive layer on the touch electrodes and the insulating layer, the adhesive layer including an adhesive protection film adhered on one surface of the adhesive layer facing away from the touch electrodes; and forming a conductive layer on the adhesive protection film.

10 Claims, 9 Drawing Sheets

MANUFACTURING METHOD OF TOUCH SCREEN PANEL

CROSS-REFERENCE TO RELATED APPLICATION

This application claims priority from and the benefit of Korean Patent Application No. 10-2014-0169121 filed on Nov. 28, 2014, which is hereby incorporated by reference for all purposes as if fully set forth herein.

BACKGROUND

Field

The present invention relates to a manufacturing method of a touch screen panel including a touch sensing sensor.

Discussion of the Background

A display device such as a liquid crystal display (LCD), an organic light emitting diode (OLED) display, an electrophoretic display, etc. includes a field generating electrode and an electro-optical active layer. For example, the OLED display includes an organic emission layer as the electro-optical active layer. The field generating electrode is connected to switching elements, such as a thin film transistor and the like, configured to receive a data signal, and the electro-optical active layer is configured to convert the data signal into an optical signal to display an image.

A display panel of the display device may include a heavy and fragile glass substrate, and the display device may have some limitations in portability and use in a large screen display. Accordingly, a flexible display device may include a plastic substrate, which is light, strong against impacts, and flexible, as a substrate of the display panel.

The display device may further include a touch sensing function for interaction with a user, in addition to a display function. A touch sensing function is configured to receive touch information, including whether an object is approaching and/or touching a screen. The touch position may be detected by sensing changes in pressure, charge, light, and the like that are applied to the screen of the display device in response to a user writing characters or drawing figures by approaching and/or touching the screen using a finger and/or a touch pen. The display device may be configured to receive an image signal in response to the touch information and display an image.

The touch sensing function may be implemented using a touch sensing sensor. The touch sensing sensor may have various types, such as a resistive type, a capacitive type, an electromagnetic type (EM), an optical type, etc.

For example, the resistive type of touch sensor may include two electrodes facing and separated from each other. When a pressure from an external object is applied, the two electrodes may contact each other. When the two electrodes contact each other, change in voltage caused by change in resistance at the touch position can be detected such that the touch position and the like are determined.

The capacitive type of touch sensing sensor includes a sensing capacitor including a plurality of sensing electrodes configured to transmit a detection signal, and is configured detect change in capacitance of the sensing capacitor or an amount of charges charged in response to a conductor such as a finger approaching the touch sensing sensor, thereby determining whether the touch occurred or not and the touch position. The capacitive type of touch sensing sensor includes a plurality of touch electrodes disposed in the touch sensing area and signal-transmitting wires connected to the touch electrodes.

The signal-transmitting wires are configured to transmit a sensing input signal to the touch electrodes, and/or to transmit a sensing output signal of the touch electrodes to a sensing signal controller.

In a flexible display device, the touch sensing sensor is formed in a separate touch screen panel and attached to the flexible display device as an add-on cell type.

When a touch screen panel is formed to have a plurality of layers, a process for forming connecting portions of a touch sensing sensor is added, thereby reducing fabrication yield and increasing cost.

Also, since the connecting portions are formed as minute patterns, steps may be generated, and etching process may leave residues which may result in corrosion.

The above information disclosed in this Background section is only for enhancement of understanding of the background of the inventive concept, and, therefore, it may contain information that does not form the prior art that is already known in this country to a person of ordinary skill in the art.

SUMMARY

The exemplary embodiments provide a simplified manufacturing process of the touch screen panel with reduce cost.

The exemplary embodiments also provide a manufacturing process of the touch screen panel reducing or preventing impurities, such as moisture and the like, from permeating into a touch sensing sensor, thereby reducing defects of the touch sensing sensor and enhancing durability thereof.

Additional aspects will be set forth in the detailed description which follows, and, in part, will be apparent from the disclosure, or may be learned by practice of the inventive concept.

According to one or more exemplary embodiments, a manufacturing method of a touch screen panel includes: forming touch electrodes on a substrate; forming an insulating layer on the touch electrodes; disposing an adhesive layer on the touch electrodes and the insulating layer, the adhesive layer including an adhesive protection film adhered on one surface of the adhesive layer facing away from the touch electrodes; and forming a conductive layer on the adhesive protection film.

The foregoing general description and the following detailed description are exemplary and explanatory and are intended to provide further explanation of the claimed subject matter.

DETAILED DESCRIPTION OF THE EMBODIMENTS

Figure 1:
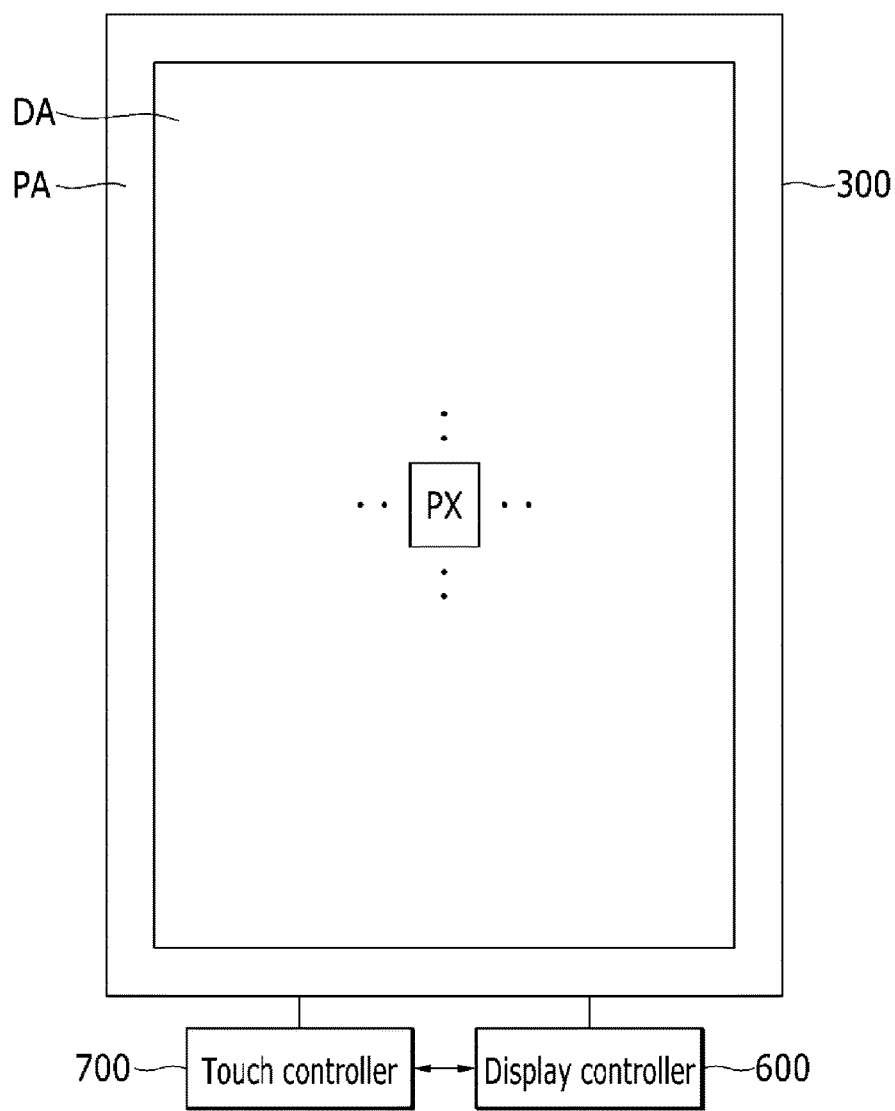
FIG. 1 is a block diagram of a display device including a touch screen panel according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to plan and/or sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A manufacturing method of a touch screen panel according to one or more exemplary embodiments will be described with reference to the drawings.

Figure 2:
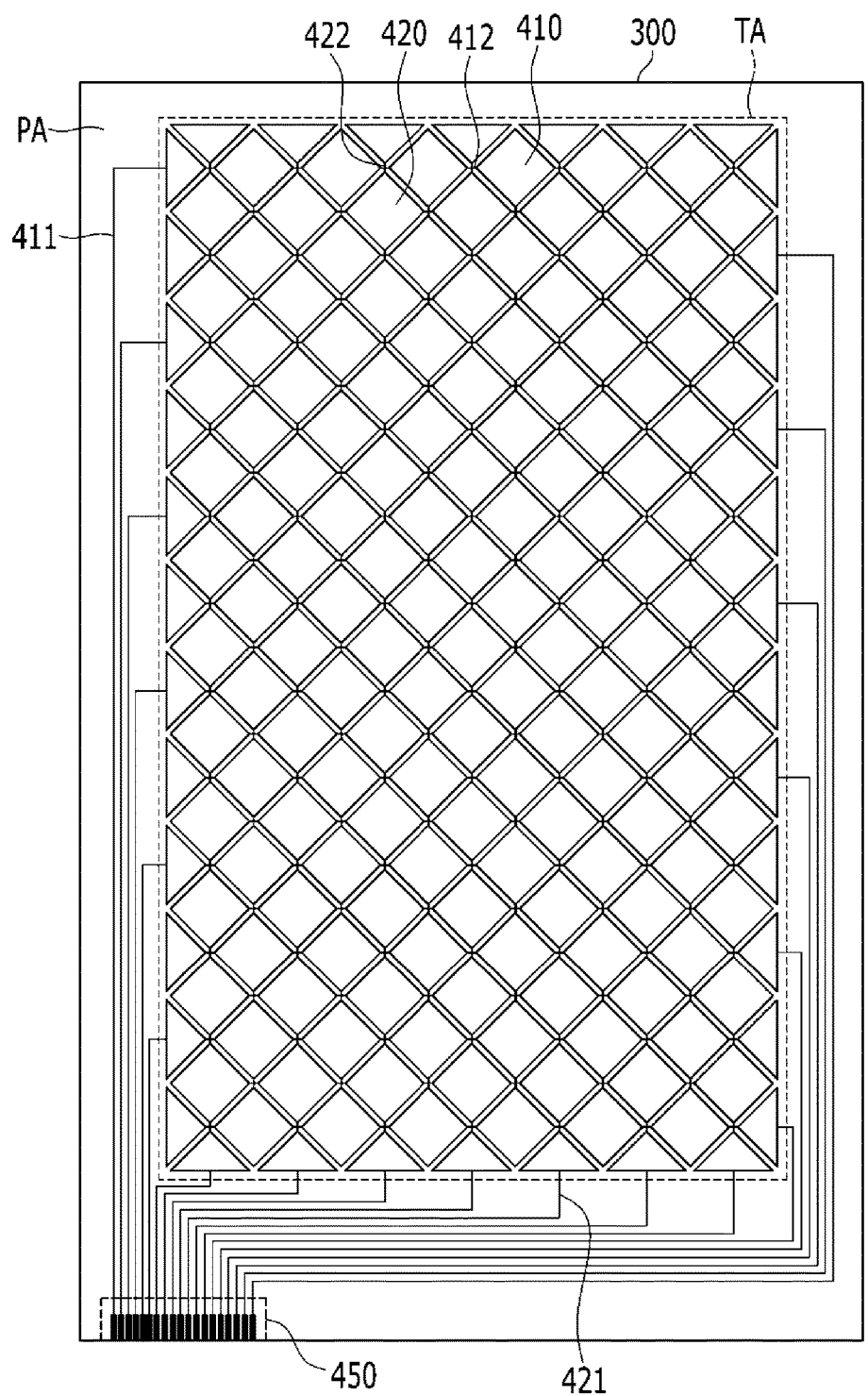
FIG. 2 is a top plan view of a touch sensing sensor of the touch screen panel according to one or more exemplary embodiments.
Figure 3:
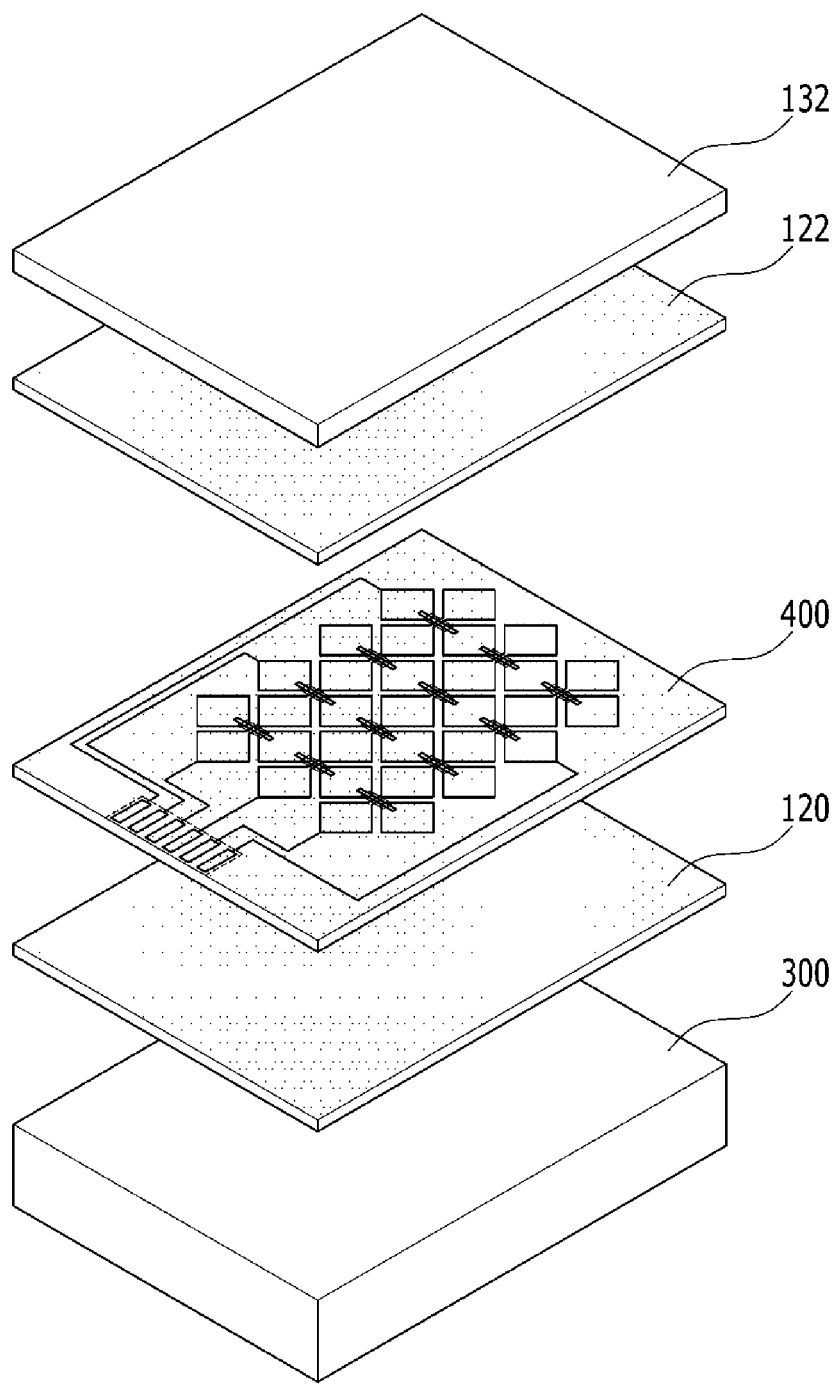
FIG. 3 is a perspective view of the display device including the touch screen panel according to one or more exemplary embodiments.
Figure 4:
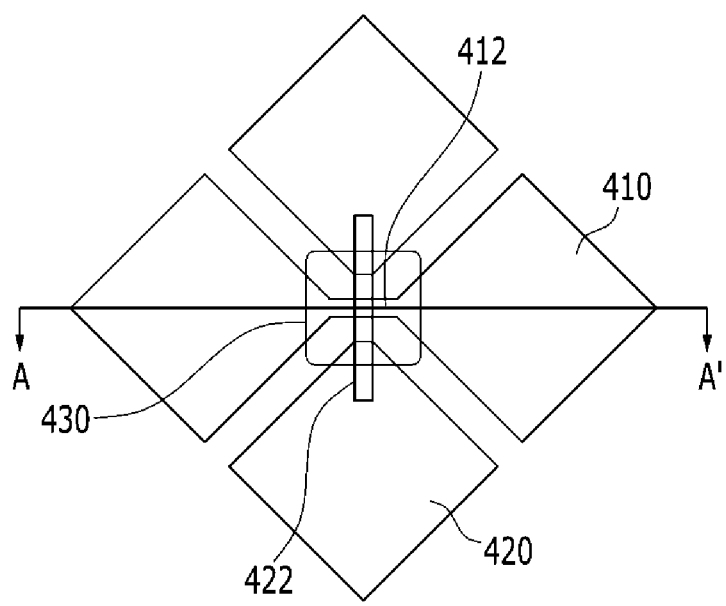
FIG. 4 is a partial enlarged view of the touch sensing sensor illustrated in FIG. 2.
Figure 5:
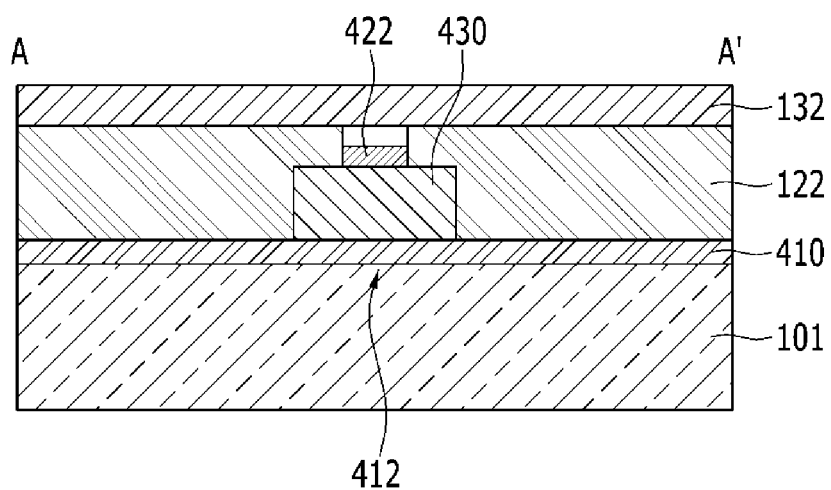
FIG. 5 is a cross-sectional view of the touch sensing sensor illustrated in FIG. 4 taken along the sectional line A-A'.

FIG. 1 is a block diagram of a display device including a touch screen panel according to one or more exemplary embodiments, and FIG. 2 is a top plan view of a touch sensing sensor of the touch screen panel according to one or more exemplary embodiments. FIG. 3 is a perspective view of the display device including the touch screen panel according to one or more exemplary embodiments, and FIG. 4 is a partial enlarged view of the touch sensing sensor illustrated in FIG. 2. FIG. 5 is a cross-sectional view of the touch sensing sensor illustrated in FIG. 4 taken along the sectional line A-A'.

Referring to FIG. 1, the display device including the touch screen panel according to one or more exemplary embodiments may include a display panel 300, and a display controller 600 and a touch controller 700 that are connected to the display panel 300. The display panel 300 may be configured to display an image, and detect a touch.

In planar view, the display panel 300 may include a display area DA configured to display the image and a peripheral area PA disposed around the display area DA.

At least some area of the display panel 300 may be a touch active area TA configured to detect the touch. The touch active area TA is an area configured to detect a touch in response to an object approaching and/or touching the display panel 300. The touch may refer to a state of an external object, such as a finger of a user, approaching the display panel 300 and/or hovering over the display panel 300, as well as directly contacting the display panel 300.

FIG. 2 illustrates an exemplary embodiment in which the entire display area DA substantially corresponds with the touch active area TA, but the exemplary embodiments are not limited thereto. Some of the peripheral area PA may correspond with the touch active area TA, or only some of the display area DA may correspond with the touch active area TA.

Referring to FIG. 1, a plurality of pixels PX and a plurality of display signal lines (not illustrated) connected to the plurality of pixels PX to transmit a driving signal are disposed in the display area DA.

The plurality of display signal lines include a plurality of scanning signal lines (not illustrated) configured to transmit a scan signal, and a plurality of data lines (not illustrated) configured to transmit a data signal. The scanning signal lines and the data lines may extend crossing each other. The plurality of display signal lines may be extended to the peripheral area PA and form a pad portion (not shown).

The plurality of pixels PX may be arranged approximately in a matrix form, but the exemplary embodiments are not limited thereto.

Each of the plurality of pixels PX may include a switching element (not shown) connected to the gate line and the data line, and a pixel electrode (not shown) connected to the switching element.

The switching element may be a three-terminal element, such as a thin film transistor or the like, that is integrated into the display panel 300. The switching element may be turned on and/or turned off according to the gate signal transmitted through the gate line to selectively transmit the data signal transmitted through the data line to the pixel electrode.

Each of the plurality of pixels PX may further include a facing electrode (not shown) that faces the pixel electrode. According to one or more exemplary embodiments including an organic light emitting diode (OLED) display, an emission layer may be disposed between the pixel electrode and the facing electrode to form a light-emitting device. The facing electrode may transmit a common voltage.

In order to implement color display, each of the plurality of pixels PX may be configured to display one of primary colors, and these primary colors may be mixed to allow a desired color to be perceived. For example, the primary colors may include three primary colors such as red, green, and blue, and/or four primary colors. Some of the Each of the plurality of pixels PX may be disposed to correspond to each pixel electrode and may further include; a color filter configured to display one of the primary colors, or the emission layer included in the organic light-emitting device configured to emit colored light.

A contact sensing sensor is disposed in the touch active area TA. The contact sensing sensor may be configured to sense contacts in various ways. For example, the contact sensing sensor may have various types such as a resistive type, a capacitive type, an electromagnetic (EM) type, an optical type, etc. According to the exemplary embodiments, the contact sensing sensor may be the capacitance type.

Referring to FIG. 2, the contact sensing sensor according to the exemplary embodiment includes a plurality of touch electrodes, and the plurality of touch electrodes may include a plurality of first touch electrodes 410 and a plurality of second touch electrodes 420. The first and second touch electrodes 410 and 420 are separated from each other.

Referring to FIG. 2, the plurality of first and second touch electrodes 410 and 420 may be alternately disposed not overlapping with each other in the touch active area TA. The plurality of first touch electrodes 410 may be disposed along column and row directions, and the plurality of second touch electrodes 420 may be disposed along the column and row directions. The first and second touch electrodes 410 and 420 may be disposed on the same layer.

The first and second touch electrodes 410 and 420 may respectively have a quadrangular shape, but the exemplary embodiments are not limited thereto, and may have various shapes and may further include, such as a protruding portion for improving sensitivity of the contact sensing sensor.

The plurality of first touch electrodes 410 disposed in the same row or column may be connected to or separated from each other inside or outside the touch active area TA. Similarly, at least some of the plurality of second touch electrodes 420 disposed in the same column or row may be connected to or separated from each other inside or outside the touch active area TA. For example, the plurality of first touch electrodes 410 disposed in the same row are connected to each other inside the touch active area TA, as shown in FIG. 2, the plurality of second touch electrodes 420 disposed in the same column may be connected to each other inside the touch active area TA.

More specifically, first connecting portions 412 may connect the plurality of first touch electrodes 410 disposed in the same row, and second connecting portions 422 may connect the plurality of second touch electrodes 420 disposed in the same column.

The first touch electrodes 410 connected to each other in each row may be connected to the touch controller 700 through first touch wires 411, and the second touch electrodes 420 connected to each other in each column may be connected to the touch controller 700 through second touch wires 421.

The first and second touch wires 411 and 421 may be disposed in the peripheral area PA of the display panel 300, as shown in FIG. 2, but the exemplary embodiments are not limited thereto, and the first and second touch wires 411 and 421 may be disposed in the touch active area TA. End portions of the first and second touch wires 411 and 421 form a pad portion 450 in the peripheral area PA of the display panel 300.

The first and second touch electrodes 410 and 420 may have a transmittance equal to or higher than a predetermined value so light from the display panel 300 may be transmitted through the first and second touch electrodes 410 and 420. For example, the first and second touch electrodes 410 and 420 may be made of a thin metal layer including at least one of indium tin oxide (ITO), indium zinc oxide (IZO), silver nanowire (AgNw), etc., and/or a transparent conductive material including at least one of a metal mesh, carbon nanotubes (CNT), etc., but the exemplary embodiments are not limited thereto.

The first and second touch wires 411 and 421 may include a transparent conductive material that is included in the first and second touch electrodes 410 and 420, and/or a low resistance material including at least one of molybdenum (Mo), silver (Ag), titanium (Ti), copper (Cu), aluminum (Al), and molybdenum/aluminum/molybdenum (Mo/Al/Mo).

The first and second touch electrodes 410 and 420 disposed adjacent to each other may form a mutual sensing capacitor that serves as the contact sensing sensor. The mutual sensing capacitor may be configured to receive a sensing input signal from either one of the first and second touch electrodes 410 and 420, and output sensing output signal according to a variation in an amount of charges due to contact of the external object through the other one of the first and second touch electrodes 410 and 420.

Unlike as shown in FIGS. 2 and 4, each of the plurality of first and second touch electrodes 410 and 420 may be separated from each other and be respectively connected to the touch controller 700 through the touch wires (not shown). In this case, each touch electrode may form a self-sensing capacitor that serves as the contact sensing sensor. The self-sensing capacitor may be configured to receive the sensing input signal and be charged with a predetermined amount of charges, and output the sensing output signal according to a variation in the amount of charge from the received sensing input signal due to the contact of the external object such as a finger occurs.

Referring back to FIG. 1, the display controller 600 is configured to control an image display operation of the display panel 300. More specifically, the signal controller 600 is configured to receive an input image signal including luminance information of each of the plurality of pixels PX and an input control signal for controlling display of the input image signal from an external device.

The signal controller 600 is configured to process the input image signal based on the input image signal and the input control signal, convert the input image signal into an output image signal, and generate control signals including a gate control signal, a data control signal, etc. The signal controller 600 is configured to output the gate control signal to a gate driver (not shown), and output the data control signal and the output image signal to a data driver (not shown).

Though not illustrated, the data driver is configured to receive the output image signal for one row of the plurality of pixels PX according to the data control signal, and convert the output image signal into the data voltage by selecting a gray-level voltage corresponding to each output image signal, thereby applying the data voltage to the corresponding data lines. The gate driver is configured to apply a gate-on voltage to the gate line according to the gate control signal to turn on the switching element connected to the gate line on. Then, the data voltage applied to the data lines is applied to the corresponding one of the plurality of pixels PX through the turned-on switching element.

When the data voltage is applied to each of the plurality of pixels PX, each of the plurality of pixels PX may display luminance corresponding to the data voltage by controlling various optical conversion elements such as the light-emitting device and the like.

The touch controller 700 is connected to the contact sensing sensor disposed in the touch active area, and is configured to control an operation of the contact sensing sensor. The touch controller 700 is configured to transmit the sensing input signal to the contact sensing sensor, and/or is configured to receive and process the sensing output signal. The touch controller 700 is configured to process the sensing output signal to generate touch information, such as whether the touch occurs or not, a touch position, etc.

The driving devices, such as the data driver, the gate driver, and the display controller 600, may be directly mounted on the display panel 300 as at least one integrated circuit (IC) chip, mounted on a flexible printed circuit film (not shown) to be attached to the display panel 300 as a tape carrier package (TCP), and/or mounted on a separate printed circuit board (PCB) (not shown). The driving devices may also be integrated into the display panel 300 along with the display signal lines, the switching elements, etc.

The touch controller 700 may be directly mounted on the display panel 300 as at least one IC chip, mounted on the flexible printed circuit film to be attached to the display panel 300 as the TCP, and/or mounted on the separate printed circuit board (PCB). The touch controller 700 may be connected to the first and second touch wires 411 and 421 through the pad portion 450 of the display panel 300.

The display panel 300 may be formed on a transparent insulating substrate including at least one of glass, quartz, ceramic, plastic, etc.

In exemplary embodiments, the touch controller 700 and display controller 600, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the touch controller 700 and display controller 600, and/or one or more components thereof may include or otherwise be associated with one or more memories (not shown) including code (e.g., instructions) configured to cause the touch controller 700 and display controller 600, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Referring to FIG. 3, the touch screen panel includes a touch sensing layer 400 in which the touch sensing sensor is formed, a cover substrate 132 formed disposed to face facing the touch sensing layer, the first adhesive layer 120 formed disposed between the touch sensing layer 400 and on the display panel 300, and a second adhesive layer 122 formed disposed on between the cover substrate 132 and the touch sensing layer 400.

The touch sensing layer 400 may be laminated onto the display panel 300 using a first adhesive layer 120. The touch sensing layer 400 may be formed by disposing at least one conductive material layer by using, for example, a sputtering method and the like, and then patterning and/or printing the at least one conductive material layer to form the plurality of touch electrodes and the plurality of touch wires.

The first adhesive layer 120 and the second adhesive layer 122 may include a transparent adhesive material having high light transmittance including at least one of a super view resin (SVR), an optically clear adhesive (OCA) film, etc.

In addition, the cover substrate 132 may include at least one of transparent glass, polyimide (PI), and polyethylene terephthalate (PET). The touch sensing layer 400 may further include a bottom insulating layer on the surface of the touch sensing layer 400 facing the display panel 300.

Referring to FIG. 4, the touch sensing sensor may include the plurality of first touch electrodes 410, the plurality of second touch electrodes 420, the first and second connecting portions 412 and 422, and an insulating layer 430. Referring to FIG. 5, a touch electrode layer is formed on the touch sensing layer substrate 101.

The substrate 101 of the touch sensing layer according to the exemplary embodiments may include at least one of plastics, metal thin films, and ultra-thin glasses. The substrate 101 of the touch sensing layer may include at least one plastic film. For example, the plastic film may include at least one of polyethylene terephthalate (PET), polyethylene naphthalate (PEN), polyimide (PI), polycarbonate (PC), polymethyl methacrylate (PMMA), polyarylate (PAR), polyether imide (PEI), polyether sulfone (PES), and cellulose triacetate (TAC). The plurality of first touch electrodes 410 and the plurality of second touch electrodes 420 may be alternately distributed not overlapping with each other in the touch electrode layer.

The plurality of first touch electrodes 410 disposed in each row are connected to each other through the first connecting portions 412, and the plurality of second touch electrodes 420 disposed in each column may be connected to each other through the second connecting portions 422.

The insulating layer 430 is disposed between the first connecting portions 412 and the second connecting portions 422, insulating the first connecting portions 412 from the second connecting portions 422. The insulating layer 430 may be a plurality of separate island-shaped insulators that are disposed at every intersection of the first connecting portions 412 and the second connecting portions 422. The insulating layer 430 may expose at least some of the first touch electrodes 410 such that the first connecting portions 412 are connected to the first touch electrodes 410.

The first connecting portions 412 interconnecting the two adjacent first touch electrodes 410 may be disposed on the same layer as the first touch electrodes 410, and may be formed of the same material as the first touch electrodes 410. That is, the first touch electrodes 410 and the first connecting portions 412 may be integrally formed, and may be simultaneously patterned.

The second connecting portions 422 interconnecting the two adjacent second touch electrodes 420 may be disposed on a different layer from that of the second touch electrodes 420. That is, the first touch electrodes 420 and the second connecting portions 422 may be separated from each other, and may be separately patterned.

The second touch electrodes 420 and the second connecting portions 422 may be directly connected to each other.

The insulating layer 430 may have a shape having right edges or a polygonal shape.

According to exemplary embodiments, an insulating layer 430 may be formed on an entire surface, with some of the insulating layer 430 removed corresponding to the second touch electrodes 420 interconnecting the adjacent second touch electrodes 420 to each other in the column direction.

The touch sensing sensor according to one or more exemplary embodiments is not limited to the illustration shown in FIGS. 4 and 5. According to exemplary embodiments, the second connecting portions 422 interconnecting the adjacent second touch electrodes 420 may be disposed on the same layer as the second touch electrodes 420, integrally formed with the second touch electrodes 420, and the first connecting portions 412 interconnecting the adjacent first touch electrodes 410 may be disposed on a different layer from that of the first touch electrodes 410. The second adhesive layer 122 may be disposed on the touch electrode layer, and the cover substrate 132 may be attached on the second adhesive layer 122.

Next, referring to FIGS. 6, 7, 8, 9, 10, and 11, a method for forming a touch electrode layer having the structure of FIG. 5 will be described.

Figure 6:
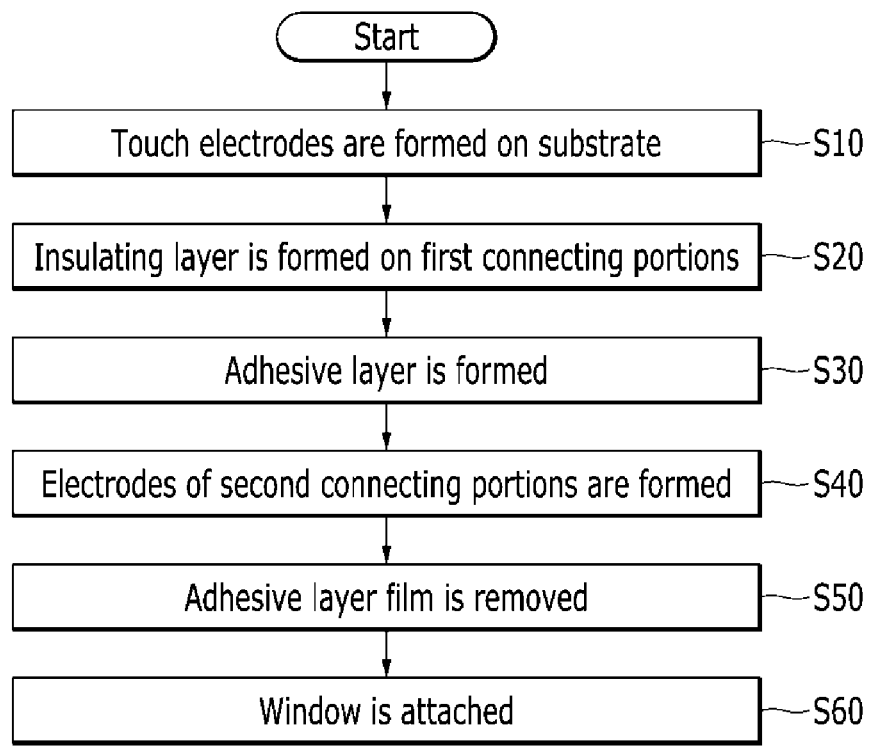
FIG. 6 is a flowchart for illustrating an exemplary manufacturing method of a touch screen panel according to one or more exemplary embodiments.

FIG. 6 is a flowchart for illustrating an exemplary manufacturing method of a touch screen panel according to one or more exemplary embodiments, and FIGS. 7, 8, 9, 10, and 11 are cross-sectional views of a touch sensing sensor according to one or more exemplary embodiments.

First, touch electrodes are formed on a substrate of the touch sensing layer (S10).

The touch electrodes include first touch electrodes 410 that extend in a first direction and second touch electrodes 420 that extend in a second direction. The first and second touch electrodes 410 and 420 may be formed by sputtering or depositing a transparent conductive oxide on the substrate. A photolithography method may also be used to form the first and second touch electrodes 410 and 420.

Next, an insulating layer 430 is formed on first connecting portions 412 interconnecting the adjacent first touch electrodes in the first direction (S20). The insulating layer 430 may include an organic or inorganic insulator made of a transparent material, the organic insulator is formed of a plastic material including at least one of polyethylene terephthalate (PET), polyethylene naphthalate (PEN), polyimide (PI), polycarbonate (PC), polymethyl methacrylate (PMMA), polyarylate (PAR), polyether imide (PEI), polyether imide (PEI), polyether sulfone (PES), and cellulose triacetate (TAC), and the inorganic insulator is formed of a glass material and/or an optical grade glass material.

For example, the insulating layer 430 may be formed by a process including at least one of depositing SiO2, laminating an acryl-based dry film, coating a liquid type of silicone and/or epoxy, and depositing a transparent insulating material such as SiO2 and/or TiO2.

The liquid type of silicone or epoxy material may be formed by a method including direct gravure coating, reverse gravure coating, micro-gravure coating, comma coating, slot die coating, slit coating, curtain coating, capillary coating, spray coating, dip coating, silk screen and spin coating, flexographic printing, gravure printing, inkjet printing, and offset printing methods.

Figure 7:
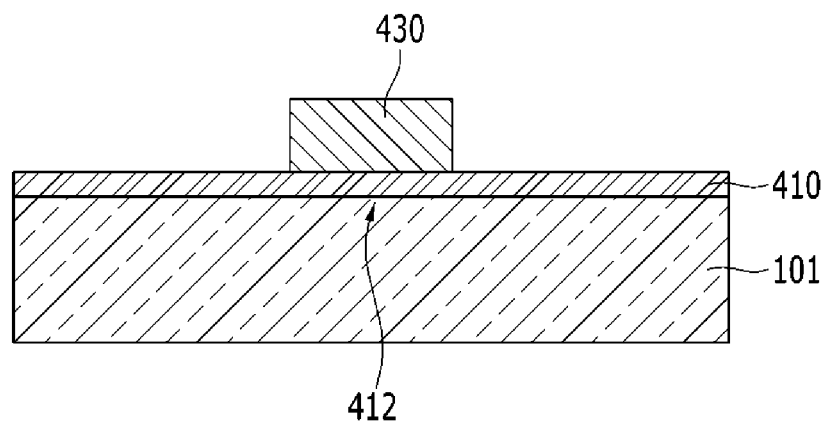
FIGS. 7, 8, 9, 10, and 11 are cross-sectional views of a touch sensing sensor according to one or more exemplary embodiments.

Referring to FIG. 7, the insulating layer 430 may be formed to have an island-shape on the first connecting portions 412.

Then, an adhesive layer 122 is formed on the touch electrode layer (S30). The adhesive layer 122 may cover an entire surface of the touch electrode layer and expose the insulating layer 430 and a peripheral area around the insulating layer 430.

Figure 8:
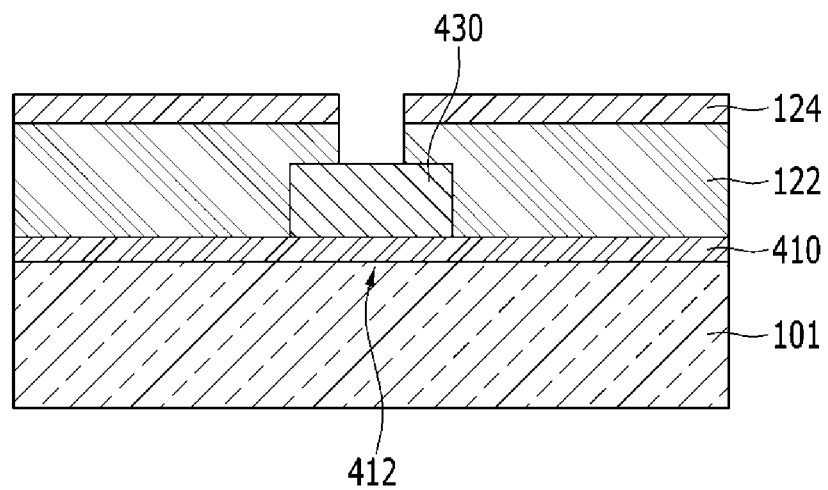

Referring to FIG. 8, the adhesive layer 122 includes an adhesive layer protection film 124 adhered on one surface of the adhesive layer 122 opposing the touch electrode layer. According to one or more exemplary embodiments, the adhesive layer 122 may be formed to partially expose the insulating layer 430 having the island-shape and the second touch electrodes 420 around the insulating layer 430. The adhesive layer may expose the second touch electrodes 420 through an opening formed in the second direction. The adhesive layer protection film 124 may be made of at least one of polyethylene (PE) and polyethylene terephthalate (PET).

Next, second connecting portions 422 are formed on the adhesive layer 122 (S40).

The second connecting portions 422 may be formed on the adhesive layer by disposing a conductive material using a method such as transferring, vapor deposition, and/or coating. The second connecting portions 422 may be formed of a metal and/or a transparent material having conductivity. For example, a thin metal layer including at least one of indium tin oxide (ITO), indium zinc oxide (IZO), aluminum zinc oxide (AZO), silver nanowire (AgNw), etc. and/or a metal mesh, and the transparent material having conductivity may include, but not limited to, carbon nanotubes (CNT).

Figure 9:
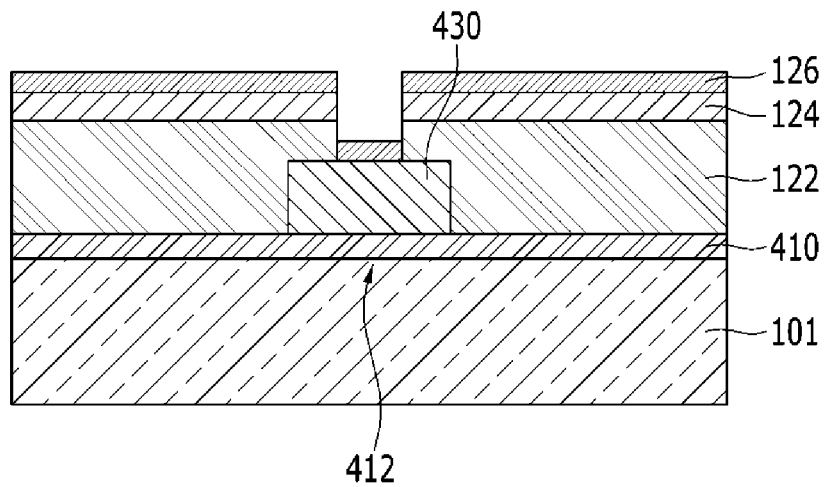

Referring to FIG. 9, the second connecting portions 422 may be formed by disposing a conductive material 126 on the adhesive layer protection film 124, and the insulating layer 430 and at least a portion of the second touch electrodes 420 adjacent to the exposed insulating layer 430 that are exposed by the adhesive layer protection film 124.

Then, the adhesive layer protection film 124 is removed (S50). The adhesive layer protection film 124 disposed on the adhesive layer 122 may be removed, and the conductive material 126 formed on the adhesive layer protection film 124. The adhesive layer protection film 124 may be removed using a method of holding one surface of the adhesive layer protection film 124 and peeling off the adhesive layer protection film 124 from the adhesive layer 122, a method of attaching one surface of the adhesive layer protection film 124 to peel it off from the adhesive layer 122, etc.

Figure 10:
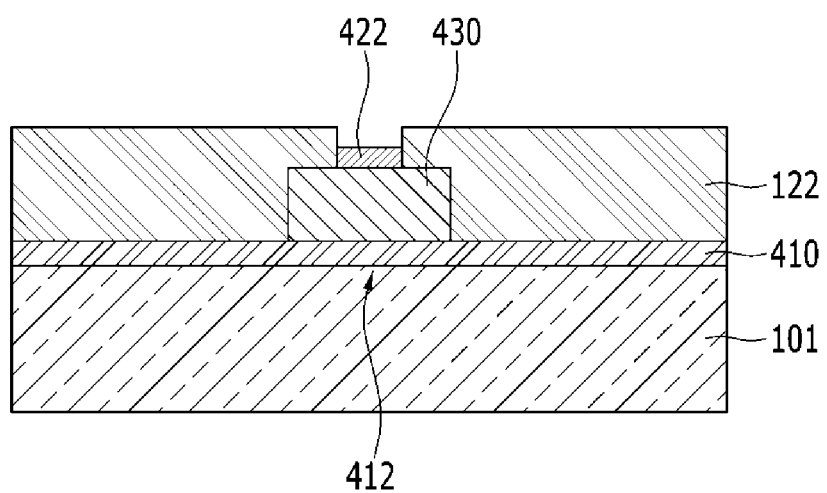

Referring to FIG. 10, when the adhesive layer protection film 124 is removed, the remaining conductive material 422 may be disposed only on the insulating layer 430 and some of the second touch electrodes 420. The surface of the adhesive layer 122 from which the adhesive layer protection film 124 is removed may have an adhesive property.

Next, a cover substrate is attached on the entire surface of the adhesive layer 122 (S60). The cover substrate may include at least one of transparent glass, polyimide (PI), polyethylene terephthalate (PET), etc.

Figure 11:
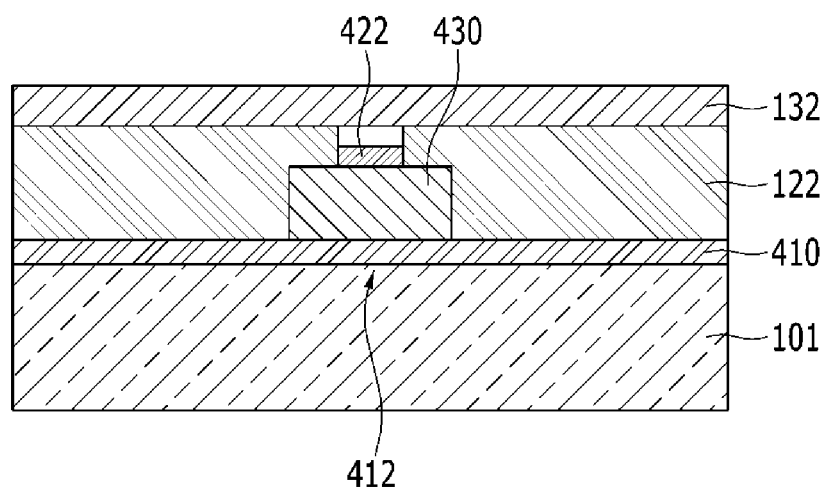

As shown in FIG. 11, the cover substrate may be attached onto the surface of the adhesive layer 122 from which the adhesive layer protection film 124 is removed. The cover substrate may encapsulate the touch screen panel to prevent permeation of external moisture and/or oxygen.

According to the manufacturing method of the touch screen panel according to the exemplary embodiments the manufacturing processes of the touch screen panel including the touch sensing sensor may be simplified and thus the cost may be reduced. Also, according to the exemplary embodiments, the moisture and the impurities, such as the residues and the like, generated during the manufacturing process may be reduced or prevented from permeating into the touch sensing sensor, thus, the defects of the touch sensing sensor may be reduced and the durability thereof may be enhanced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of manufacturing a touch screen panel, comprising:
   forming touch electrodes on a substrate;
   forming an insulating layer on at least a part of the touch electrodes;
   disposing an adhesive layer on the touch electrodes and the insulating layer, the adhesive layer exposing at least a part of the insulating layer and at least a part of the touch electrodes around the insulating layer, the adhesive layer further comprising an adhesive protection film adhered on one surface of the adhesive layer facing away from the touch electrodes;
   forming a conductive layer on the adhesive protection film, and the insulating layer and the touch electrodes that are exposed by the adhesive layer; and
   removing the conductive layer formed on the protection film by removing the adhesive protection film.

2. The method of claim 1, wherein the forming the touch electrodes comprises:
   forming first touch electrodes extending in a first direction not overlapping each other; and
   forming second touch electrodes in a second direction,
   wherein the first touch electrodes and the second touch electrodes are alternately disposed not overlapping each other, and
   wherein the touch screen panel comprises:
      first connecting portions electrically connecting two of the first touch electrodes that are adjacent to each other in the first direction; and
      second connecting portions electrically connecting two of the second touch electrodes that are adjacent to each other in the second direction.

3. The method of claim 2, wherein the forming the insulating layer comprises:
   forming the insulating layer in an island-shape in areas where the plurality of first connecting portions crosses the second connecting portions.

4. The method of claim 3, wherein the forming the adhesive layer comprises:
   forming the adhesive layer to expose the insulating layer and the second touch electrodes adjacent to the insulating layer.

5. The method of claim 4, wherein the second touch electrodes are exposed by openings formed in the adhesive layer in the second direction.

6. The method of claim 5, wherein the first connecting portions are disposed on the same layer as the first touch electrodes, and
   the first connecting portions is integrally formed with the first touch electrodes.

7. The method of claim 1, wherein the second connecting portions are disposed on the insulating layer.

8. The method of claim 7, wherein the first connecting portions and the second connecting portions are insulated by the insulating layer.

9. The method of claim 1, further comprising:
   attaching a cover substrate onto a surface of the adhesive layer from which the protection film is removed.

10. The method of claim 1, wherein the adhesive layer includes an optically clear adhesive (OCA) film.

* * * * *

UNITED STATES PATENT AND TRADEMARK OFFICE
CERTIFICATE OF CORRECTION

Page 1 of 1

PATENT NO. : 10,061,448 B2
APPLICATION NO. : 14/864311
DATED : August 28, 2018
INVENTOR(S) : Sang Min Baek It is certified that error appears in the above-identified patent and that said Letters Patent is hereby corrected as shown below:

In the Specification

Under "Detailed Description of The Embodiments":

In Column 5, Line 46, delete "Some of the".

Signed and Sealed this
Twentieth Day of July, 2021

Drew Hirshfeld
*Performing the Functions and Duties of the
Under Secretary of Commerce for Intellectual Property and
Director of the United States Patent and Trademark Office*